United States Patent [19]

Shiba et al.

[11] Patent Number: 5,133,095
[45] Date of Patent: Jul. 28, 1992

[54] METHOD OF AND SYSTEM FOR SUPPLYING ELECTRIC POWER TO AUTOMATIC WATER DISCHARGE APPARATUS

[75] Inventors: Masashi Shiba; Katsuhiro Shida, both of Mito, Japan

[73] Assignee: Hoxan Corporation, Sapporo, Japan

[21] Appl. No.: 754,024

[22] Filed: Sep. 3, 1991

[30] Foreign Application Priority Data

Aug. 31, 1990 [JP] Japan .................................. 2-230877

[51] Int. Cl.$^5$ .............................................. F03D 1/00
[52] U.S. Cl. ............................................ 4/313; 4/304; 4/623
[58] Field of Search .................... 4/302, 303, 304, 305, 4/313, 623, DIG. 3; 137/78.1; 251/129.15

[56] References Cited

U.S. PATENT DOCUMENTS

| | | | |
|---|---|---|---|
| 2,507,966 | 5/1950 | Filliung, Jr. | 4/303 |
| 2,688,141 | 9/1954 | Filliung | 4/303 |
| 3,575,640 | 4/1971 | Ishikawa | 4/303 |
| 3,863,196 | 1/1975 | Hilles | 4/303 |
| 4,141,091 | 2/1975 | Pulvari | 4/DIG. 3 |
| 4,707,338 | 11/1987 | Spector | 422/124 |
| 4,916,613 | 4/1990 | Lange et al. | 4/304 |
| 4,984,314 | 1/1991 | Wiegert | 4/663 |
| 5,003,643 | 4/1991 | Chung | 4/313 |

Primary Examiner—Steven L. Stephan
Assistant Examiner—Ben Davidson
Attorney, Agent, or Firm—Fleit, Jacobson, Cohn, Price, Holman & Stern

[57] ABSTRACT

An electric power supply system is provided for an automatic water discharge device for discharging water to flush a basin. An object detector detects a person before the basin. A brightness detector, which consumes less electric power than the object detector, detects a brightness surrounding the basin. An electric power is supplied to the object detector on a power supply cycle so as to intermittently render it operative and to the brightness detector on a brightness detect cycle. The brightness detect cycle is longer than the power supply cycle. After a set time period following disappearance of a person from the basin, the electric power is, on one hand, shut off from the object detector to render it inoperative and, on the other hand, supplied to the brightness detector on the brightness detect cycle immediately after the shut off of electric power to the object detector, to detect a brightness surrounding the basin. When the brightness detector detects a brightness higher than a predetermined brightness, the supply of electric power is resumed on the power supply cycle for the object detector.

14 Claims, 1 Drawing Sheet

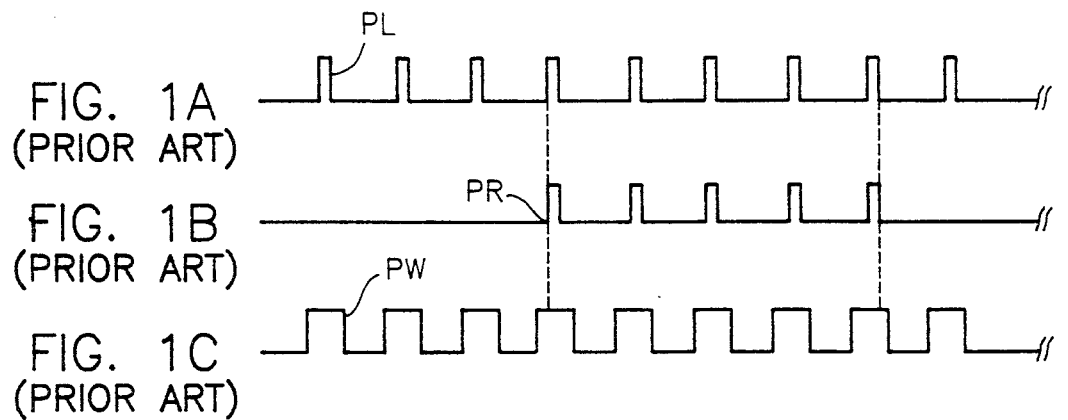
FIG. 1A (PRIOR ART)
FIG. 1B (PRIOR ART)
FIG. 1C (PRIOR ART)
FIG. 2
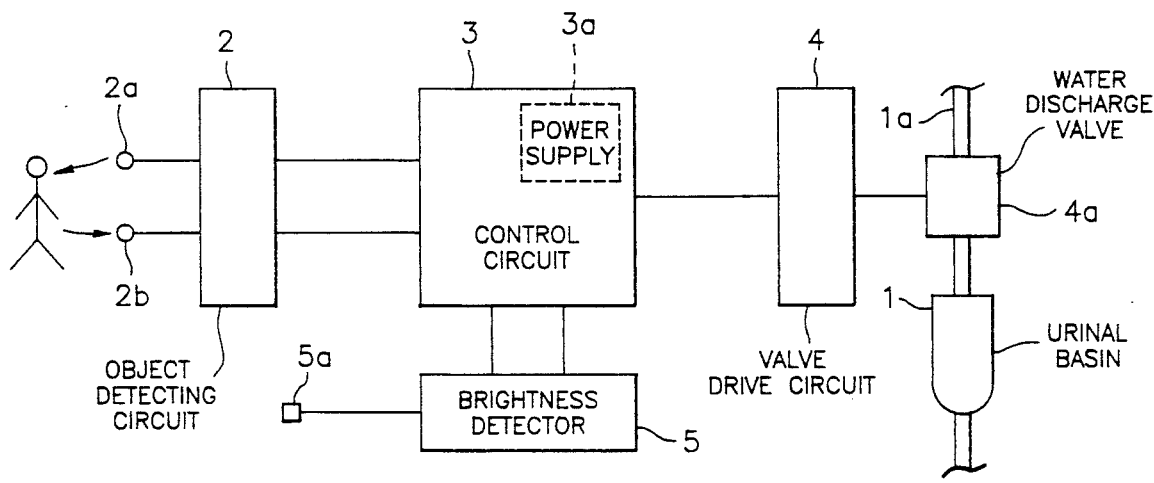
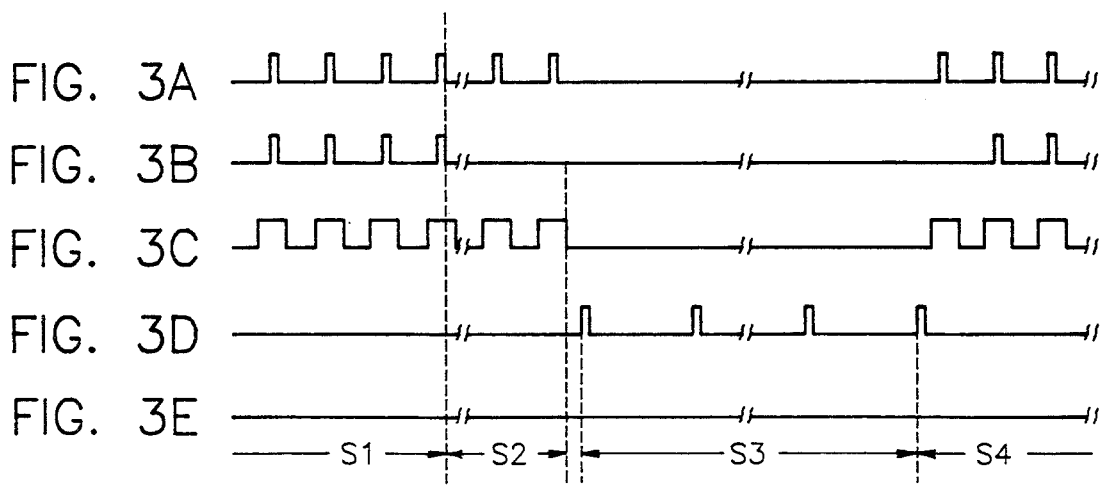
FIG. 3A
FIG. 3B
FIG. 3C
FIG. 3D
FIG. 3E

METHOD OF AND SYSTEM FOR SUPPLYING ELECTRIC POWER TO AUTOMATIC WATER DISCHARGE APPARATUS

The present invention relates to a method of and a system for supplying electric power to an automatic water discharge apparatus, and, more particularly, to a method of and a system for supplying electric power in a way which minimizes electric power consumed by an automatic water discharge apparatus in order to prolong the lifetime of a source of electric power.

BACKGROUND OF THE INVENTION

An automatic flush toilet, such as an automatic flush urinal stool or basin, is provided with a water discharge apparatus which automatically discharges a predetermined quantity of water to flush the urinal basin after a usage of the urinal basin. Discharging either a predetermined quantity of water or water for a predetermined period of time is controlled by a user or person relieving himself. That is, an electric object sensor, such as are comprised of photo-electric elements, is installed in or near the urinal basin to detect the person standing before the urinal basin. When the object sensor detects a disappearance or absence of the person from the urinal basin after having once detected the person relieving himself, the water discharge apparatus is caused to automatically discharge water to flush the urinal basin. In order to reduce electric power consumption for a battery or a source of electric power providing power to the water discharge apparatus, the object sensor is designed and adapted to be actuated timely.

For the purpose of providing a brief background that will enhance an understanding of the present invention, reference is made to FIGS. 1A to 1C showing a practical power supply system of a prior art automatic water discharge apparatus.

Referring to FIGS. 1A to 1C, a photo-electric sensor circuit, having a light emitting element and a light receiving element, is intermittently supplied with a predetermined voltage of electric power PW on a controlled cycle, for example usually one (1) sec. as is shown in FIG. 1C. The light emitting element, such as an infrared light emitting diode, is energized to emit infrared light pulse PL on the same controlled cycle as shown in FIG. 1A. The light receiving element detects the infrared light pulse reflected by a person standing before the urinal basin to provide an output signal pulse PR as long as the person remains before the urinal basin as shown in FIG. 1B. The signal pulse PR disappears from the light receiving element immediately after the person moves away from the urinal basin. The disappearance or absence of signal pulse causes a water discharge valve to allow water to be discharged and flush the urinal basin.

Whereas the prior art automatic water discharge apparatus has been constituted in an attempt to lower the consumption of electric power in its own way, nevertheless, since the photo-electric sensor circuit itself consumes electric power to a considerable extent, it is impossible to reduce sufficiently the consumption of electric power. Thus, the lifetime of a source of electric power is unnecessarily shortened, or power is unnecessarily consumed.

SUMMARY OF THE INVENTION

It is, therefore, a primary object of the present invention to provide a method of and a system for supplying electric power to an automatic water discharge apparatus to flush a basin, such as a urinal basin, which can reduce considerably electric power consumption.

The above object of the present invention is accomplished by providing a method of and an apparatus for supplying electric power to an automatic water discharge device having an electrically controlled valve which is automatically actuated for a predetermined period of time to discharge water for flushing a basin, such as a urinal basin, after a usage of the basin.

The electric supply apparatus has an electrically controlled object detecting means and an electrically controlled brightness detecting means which consumes electric power or drains electric power less than the object detecting means, both being associated with the basin. The electrically controlled object detecting means is supplied with electric power on a predetermined power supply cycle so as to intermittently operate to detect a disappearance or removal of a person from the basin. The electrically controlled brightness detecting means is supplied with electric power on a predetermined brightness detect cycle, longer than the predetermined power supply cycle, so as to intermittently operate to detect a brightness of a place surrounding the basin, such as the interior of a bathroom, higher or greater than a predetermined brightness.

After an elapse of a predetermined period of time following or after the disappearance or removal of a person from the basin following detection by the object detecting means, the electric power is, on one hand, shut off from the object detecting means so as to render the object detecting means inoperative and, on the other hand, immediately after the shut off of electric power to the object detecting means, electric power is supplied to the brightness detecting means on the predetermined brightness detect cycle so as to intermittently detect a brightness surrounding the basin. When the brightness detecting means detects a brightness surrounding the basin higher or greater than the predetermined brightness, the supply of electric power is resumed or again applied to the predetermined power supply cycle for the object detecting means.

According to the electric power supply method and apparatus of the present invention, because normally an electric power is not supplied to the object detecting means but rather to the brightness detecting means while the place surrounding the basin, for example the interior of a bathroom, is dark, a great decrease in electric power consumption is realized. Although the brightness detecting means remains operative during darkness, since the brightness detecting means, which in turn consumes less electric power than the object detecting means, is supplied with an electric power on the predetermined brightness detect cycle longer than the predetermined power supply cycle, the electric power supply apparatus of the present invention experiences a great decrease in electric power consumption as compared with any conventional known electric power supply apparatus for an automatic water discharge device.

For even less consumption of electric power, it is desirable to shut off the supply of electric power from the brightness detecting means simultaneously with the resumption of electric power supply to the object detecting means.

The electric power supply method and apparatus in accordance with a specific embodiment of the present invention comprises a photo-electric sensor having, as the object detecting means, a light emitting element for emitting a light pulse every cycle of supply of electric power and a light receiving element for receiving the light pulse reflected from the person to provide a signal pulse. The disappearance or removal of a person from the basin is detected or decided by the fact of a disappearance of the signal pulse from the light receiving element.

BRIEF DESCRIPTION OF THE DRAWINGS

The above and other objects and features of the present invention will be apparent to those skilled in the art from the following description of a preferred embodiment thereof when considered in conjunction with the accompanying drawings, in which:

FIGS. 1A to 1C are time charts of pulses provided by various elements of a prior art electric power supply system for an automatic water discharge apparatus;

FIG. 2 is a block diagram showing a system for supplying an electric power for an automatic water discharge apparatus in accordance with a preferred embodiment of the present invention; and FIGS. 3A to 3E are time charts of pulses provided by various elements of the electric power supply system shown in FIG. 2.

DETAILED DESCRIPTION OF THE PREFERRED EMBODIMENT

Referring to the drawings in detail, particularly, to FIG. 2, an electric power supply system for an automatic water discharge apparatus in accordance with a preferred embodiment of the present invention is shown, comprising a photo-electric object detecting circuit 2, a control circuit 3 and a valve drive circuit 4. The photo-electric object detecting circuit 2 includes a light emitting element 2a, such as an infrared light emitting diode, and a light receiving element 2b and is installed in or associated with a urinal basin 1. The urinal basin I has a water tube 1a with a water discharge valve 4a through which water is discharged to flush the urinal basin 1. The control circuit 3 includes therein a source of electric power 3a, such as a battery, and controls the supply of electric power to the photo-electric object detecting circuit 2. The source of electric power 3a may be provided outside the control circuit 3. The control circuit 3 further provides the valve drive circuit 4 with an output signal responding to a disappearance of output from the light receiving element 2b so as to actuate the water discharge valve 4a for discharging water into the urinal basin 1. The elements described thus far are known and readily available. The electric power supply system further comprises a conventional brightness detecting circuit 5 with a conventional brightness sensor element 5a connected to the control circuit 3. The brightness sensor element 5a is installed in the urinal basin or, otherwise, may be disposed near the urinal basin 1 to detect a brightness of the place surrounding the urinal basin 1, such as the interior of a bathroom or toilet.

The control circuit 3 supplies a rated electric power PW (FIG. 3C) on a controlled power supply cycle, for example one (1) second, to the photo-electric object detecting circuit 2 so as to energize the light emitting element 2a to emit one light pulse PL (FIG. 3A) for every supply of the rated electric power. The light pulse PL is directed forward from the urinal basin 1. When a user or person stands in a area before the urinal basin 1 in the path or where the light pulse PL can reach, the light receiving element 2b receives a light pulse reflected from the person while the person remains before the urinal basin 1. Responding to the reception of a reflected light pulse by the light receiving element 2b, the photo-electric object detecting circuit 2 generates a signal pulse PR (FIG. 3B) which in turn is sent to the control circuit 3. As is apparent, although the light emitting element 2a continually emits the light pulses PL, the photo-electric object detecting circuit 2 does not generate any signal pulse PR after the person moves away from the urinal basin 1 and while nobody stands before the urinal basin 1.

When the person moves away from the urinal basin 1 after a period of time S1, the signal pulse PR disappears from the photoelectric object detecting circuit 2. Responding to the disappearance of signal pulse PR from the photo-electric object detecting circuit 2, this indicates that the person has moved away from the urinal basin, then, the control circuit 3 causes the valve drive circuit 4 to actuate the water discharge valve 4a to open for a predetermined period of time, so that a substantially fixed quantity of water is discharged into the urinal basin 1 through the water tube 1a to flush the urinal basin 1. After a predetermined period of time S2 after the disappearance of pulse signal PR, the control circuit 3 shuts off the supply of electric power PW to the photo-electric object detecting circuit 2 from the electric power source 3a and simultaneously starts to supply a rated electric power PWo (FIG. 3D) on a controlled brightness detecting cycle, for example 2 (two) seconds, to the brightness detecting circuit 5. In order for the automatic water discharge apparatus to reduce electric power consumption, it is desirable to set the rated electric power PWo for the brightness detecting circuit 5 shorter in duration and longer in cycle than the rated electric power PW for the photo-electric object detecting circuit 2.

Every time the rated electric power PWo is supplied, the brightness detecting circuit 5 is brought into operation so as to cause the brightness sensor element 5a to detect a brightness of the place surrounding the urinal basin 1. If the brightness sensor element 5a detects the place or area surrounding the urinal basin 1 to be dark, or to be less bright than a predetermined threshold brightness, for example while a light of a bathroom or toilet is kept turned off, the brightness detecting circuit 5 does not provide any signal to the control circuit 3. On the other hand, if the brightness sensor element 5a detects a brightness of the place or area surrounding the urinal basin changed above the predetermined brightness, such as when the bathroom light is turned on, the brightness detecting circuit 5 provides a control signal pulse PB to the control circuit 3. The control circuit 3, until receiving a control signal pulse PB from the detecting circuit 5, continues to supply the rated electric power PWo on the controlled power supply cycle. During a period of time shown by a reference S3 in FIG. 3D, the place surrounding the urinal basin 1 remains dark, or less bright than the predetermined brightness.

When receiving the control signal pulse PB, which, in turn, indicates that the place surrounding the urinal basin 1 has lighten up and has become brighter than the predetermined brightness, the control circuit 3 shuts off the supply of the rated electric power PWo to the brightness detecting circuit 5 and simultaneously resumes the supply of the rated electric power PW to the photoelectric object detecting circuit 2 so as to bring it into readiness for detecting a person before the urinal basin 1. During a period of time S4 shown in FIG. 3E, the place surrounding the urinal basin 1 is more brighter than the predetermined brightness.

It is to be understood that although the present invention has been described in detail with respect to a preferred embodiment thereof, various other embodiments and variants are possible to which fall within the scope and spirit of the present invention, and such other embodiments and variants are intended to be covered by the following claims.

What is claimed is:

1. A method of supplying electric power to an automatic water discharge device having an electrically controlled valve which is automatically actuated for a predetermined period of time to discharge water for flushing a basin when object detecting means associated with said basin detects a disappearance of a person from said basin, said method comprising the steps of:
    supplying electric power at a predetermined power supply cycle to said object detecting means for detecting a person standing before said basin;
    shutting off said supply of electric power to said object detecting means after an elapse of a predetermined period of time following detection of a person standing before said basin and disappearance of said person standing before said basin so as to render said object detecting means inoperative;
    providing a brightness detector for detecting brightness surrounding said basin;
    commencing supply of electric power to said brightness detector on a predetermined brightness detect cycle responsive to shutting off of said electric power to said object detecting means to detect brightness surrounding said basin; and
    resuming said supply of electric power to said object detecting means responsive to the brightness detector detecting a brightness surrounding said basin higher than a predetermined brightness.

2. A method as recited in claim 1, and further comprising the step of: shutting off said supply of electric power to said brightness detector at said predetermined brightness detect cycle simultaneously with said step of resuming supply of electric power to said object detecting means.

3. A method as recited in claim 1, wherein said predetermined brightness detect cycle is longer than said predetermined power supply cycle.

4. A method as recited in claim 1, and further including the step of causing said object detecting means once every said predetermined power supply cycle to detect for an object or person standing before said basin.

5. A method as recited in claim 1, and further including the step of causing said brightness detector to detect for brightness in an area surrounding said basin during each predetermined brightness detect cycle.

6. An electric power supply system for supplying electric power to an automatic water discharge device which comprises an electrically controlled valve for discharging water for a predetermined period of time to flush a basin after a person's usage of said basin, said system comprising:
    object detecting means associated with said basin for detecting a presence of and a disappearance of a person standing before said basin;
    brightness detecting means associated with said basin for detecting a brightness surrounding said basin higher than a predetermined brightness; and
    control means for supplying an electric power on a predetermined power supply cycle to said object detecting means to detect a person before said basin, for causing said electrically controlled valve to discharge said water when said object detecting means detects the disappearance of said person from the basin, said control means shutting off said supply of electric power to said object detecting means after an elapse of a predetermined period of time following disappearance of said person standing before the basin to render said object detecting means inoperative, commencing supply of electric power on a predetermined brightness detect cycle to said brightness detecting means after shutting off said supply of electric power to detect a brightness in the area of said basin, and resuming said supply of electric power to said object detecting means when said brightness detecting means detects a brightness in the area of said basin higher than a predetermined brightness.

7. An electric power supply system as recited in claim 6, wherein said control means further shuts off said supply of electric power to said brightness detecting means simultaneously with said resuming said supply of electric power to said object detecting means.

8. An electric power supply system as recited in claim 6, wherein said predetermined brightness detect cycle is longer than said predetermined power supply cycle.

9. An electric power supply system as recited in claim 6, wherein said object detecting means is caused once every said predetermined power supply cycle to search for an object standing before said basin.

10. An electric power supply system as recited in claim 6, wherein said brightness detecting means is caused once every said predetermined brightness detect cycle to detect for brightness in an area surrounding said basin.

11. An electric power supply system as recited in claim 6, wherein said object detecting means comprises a photo-electric sensor.

12. An electric power supply system as recited in claim 11, wherein said object detecting means comprises a light emitting element for emitting a light pulse on said predetermined power supply cycle and a light receiving element for receiving said light pulse reflected from said person to provide said control means with a signal pulse.

13. An electric power supply system as recited in claim 12, wherein said light emitting element comprises a light emitting diode.

14. An electric power supply system as recited in claim 12, wherein said light emitting element comprises an infrared light emitting diode.

* * * * *